Dec. 15, 1953  C. H. LITTLE  2,662,291
DRAFTING MACHINE
Filed May 3, 1947  5 Sheets-Sheet 2

INVENTOR.
BY CHARLES HUBBARD LITTLE
Kurs, Hudson, Boughton & Williams
ATTORNEYS

Dec. 15, 1953

C. H. LITTLE 2,662,291

DRAFTING MACHINE

Filed May 3, 1947

INVENTOR.
CHARLES HUBBARD LITTLE
BY
Kwis, Hudson, Boughton & Williams
ATTORNEYS

Dec. 15, 1953 — C. H. LITTLE — 2,662,291
DRAFTING MACHINE
Filed May 3, 1947 — 5 Sheets-Sheet 4

INVENTOR.
CHARLES HUBBARD LITTLE
BY
Kwis, Hudson, Boughton & Williams
ATTORNEYS

INVENTOR.
CHARLES HUBBARD LITTLE
BY
Kwis, Hudson, Boughton & Williams
ATTORNEYS

Patented Dec. 15, 1953

2,662,291

UNITED STATES PATENT OFFICE 2,662,291

DRAFTING MACHINE

Charles Hubbard Little, Cleveland, Ohio, assignor to Universal Drafting Machine Corporation, Cleveland, Ohio, a corporation of Ohio Application May 3, 1947, Serial No. 745,800

15 Claims. (Cl. 33—79)

The present invention relates to drafting and like machines comprising a parallel motion arm having an instrument or protractor head at one end, including indexible members, and to indexing mechanisms generally.

One of the objects of the invention is the provision of a novel and improved drafting machine or similar device having a parallel motion mechanism or arm, one end of which is adapted to be connected to a drawing board or the like, and an instrument head operatively connected to or forming a part of the other end of the parallel motion arm, which device will be accurate in operation but relatively light in appearance and construction and in which the overall height of the instrument head will be a minimum.

Another of the principal objects of the invention is the provision of a novel and improved drafting machine or similar device comprising a parallel motion mechanism or arm having an instrument or protractor head at one end thereof including an indexible ruler or instrument assembly, and simple, accurate, and durable mechanism of improved design for indexing said ruler or instrument assembly.

Another object of the invention is the provision of a novel and improved drafting machine or device comprising two relatively rotatable members, such as, protractor elements, one of which is normally fixed and the other indexible relative thereto, in combination with indexing mechanism so constructed and arranged as to be free from errors due to lost motion, wear, eccentricity between the axis of relative rotation between the members and the center of indexing, has a maximum locating or gauging length for any given diameter of indexing circle or the like, and can be readily manufactured and assembled by persons of less skill than those ordinarily required in the manufacture of precision devices of the character referred to.

Another object of the invention is the provision of a novel and improved drafting machine or device comprising two relatively rotatable members, such as, protractor elements, one of which is normally fixed and the other indexible relative thereto, in combination with indexing mechanism including a series of locating abutment means forming pairs of contact or gauge points on one of the members, a locating abutment means forming a pair of gauge or contact points on the other member, and a notcher or index pawl or lock member adapted to be wedged between the locating abutment means on the relatively rotatable members.

Another object of the invention is the provision of a novel and improved drafting machine or similar device comprising a parallel motion mechanism having an instrument head at one end including two relatively rotatable members, preferably protractor elements, one of which is normally fixed with respect to the arm and the other indexible relative thereto and forming a part of a rotatable instrument or ruler assembly, in combination with indexing mechanism including a series of face-type index notches or slots.

Another object of the invention is the provision of a novel and improved drafting machine or similar device comprising a parallel motion mechanism having an instrument head at one end including two relatively rotatable members, such as, protractor elements, one of which is normally fixed with respect to the arm and the other indexible relative thereto and forming a part of a rotatable instrument or ruler assembly, in combination with indexing mechanism including a series of locating abutment means on one of the members or protractor elements forming a plurality of pairs of gauge or contact points thereon, a locating abutment means forming a pair of gauge or contact points on the other of said members or protractor elements, and a notcher or index pawl adapted to be wedged between the locating abutment means on the relatively rotatable members.

Another object of the invention is the provision of a novel and improved drafting machine or similar device comprising a parallel motion mechanism having an instrument head at one end including two relatively rotatable members, such as, protractor elements, one of which is normally fixed with respect to the arm and the other indexible relative to the first and forming a part of a rotatable instrument or ruler assembly, in combination with indexing mechanism including a series of diametrically opposite, face-type index notches or slots formed in the normally stationary member or protractor element providing a series of pairs of diametrically opposite spaced gauging or contact locating surfaces or points thereon, a gauging or locating surface on the other of said members or protractor elements, and a notcher or index pawl operatively connected to the instrument assembly and reciprocable transversely of the axis of relative rotation between said members or protractor elements into and out of wedging engagement with diametrically opposite portions of the locating surfaces or points of the stationary member or protractor element and the locating surface of the other of said members or protractor elements.

Another object of the invention is the provision of a novel and improved drafting machine or the like comprising a parallel motion mechanism or arm having an instrument or protractor head at one end including two relatively rotatable protractor elements, one of which is normally fixed with respect to the arm and the other of which is indexible relative to the latter and forms a part of an instrument or ruler assembly, and a knob-like operating handle in combination with indexing mechanism for indexing the ruler or instrument assembly with respect to the stationary protractor element, which indexing mechanism comprises a plurality of face-type index slots, an index notcher or pawl member movable into and out of said slots, and a thick, arched thumb piece for moving said notcher or pawl member, said arched thumb piece having the arched part thereof projecting from a slot in the handle, and selectively operable locking means associated with the thumb piece for holding it in disengaged position, as desired.

Another object of the invention is the provision of a novel and improved drafting machine or similar device comprising a parallel motion mechanism having an instrument head at one end including a rotatable spindle, a hand grasp operatively connected to the upper end of said spindle, an instrument holding member rotatably supported adjacent to the opposite end of said spindle, a dish-shaped, resilient member connected to the lower end of the spindle and engageable within an annular aperture or recess in the instrument holding member for clamping said instrument holding member to said spindle, and means for producing relative movement between said instrument holding member and the spindle in a direction axially of the spindle to clamp and unclamp the instrument holding member to the spindle.

Another object of the invention is the provision of a novel and improved drafting machine or similar device comprising a parallel motion mechanism having an instrument head at one end comprising two relatively rotatable members, such as, protractor elements, one of which is normally fixed with respect to the arm and the other rotatable relative thereto and forming a part of a rotatable instrument or ruler assembly including a hand grasp, and clamp means comprising a manually operable, bell crank-shaped operating member located adjacent to the hand grasp and so located as to be conveniently moved by the thumb of the operator for selectively clamping the instrument assembly to the normally stationary member.

Another object of the invention is the provision of a novel and improved drafting machine or similar device comprising a parallel motion mechanism or arm of the wheel and band type having an instrument or protractor head at one end including a rotatable instrument or ruler assembly, which instrument or protractor head is so constructed and arranged as to facilitate manufacture and assembly thereof and comprises a member or assembly including a band wheel, a bearing for the instrument or ruler assembly concentric with the band wheel, a plurality of index gauging or locating surfaces, and a protractor graduated with reference to said index gauging or locating surfaces.

Another object of the invention is the provision of a novel and improved instrument or drafting head comprising two relatively rotatable members, one of which is indexible relative to the other and forms a part of an instrument or ruler assembly, and indexing mechanism of the character referred to above.

Another object of the invention is the provision of a novel and improved drafting or instrument head comprising two relatively rotatable members, and means of the character referred to for clamping the same together in various positions.

The invention resides in certain constructions and combinations and arrangements of parts and further objects and advantages will be apparent to those skilled in the art to which the invention relates from the following description of the preferred embodiment described with reference to the accompanying drawings forming a part of this specific specification in which similar reference characters designate corresponding parts, and in which Fig. 1 is a plan view of the drafting machine embodying the present invention, attached to a drawing board;

Figure 1:
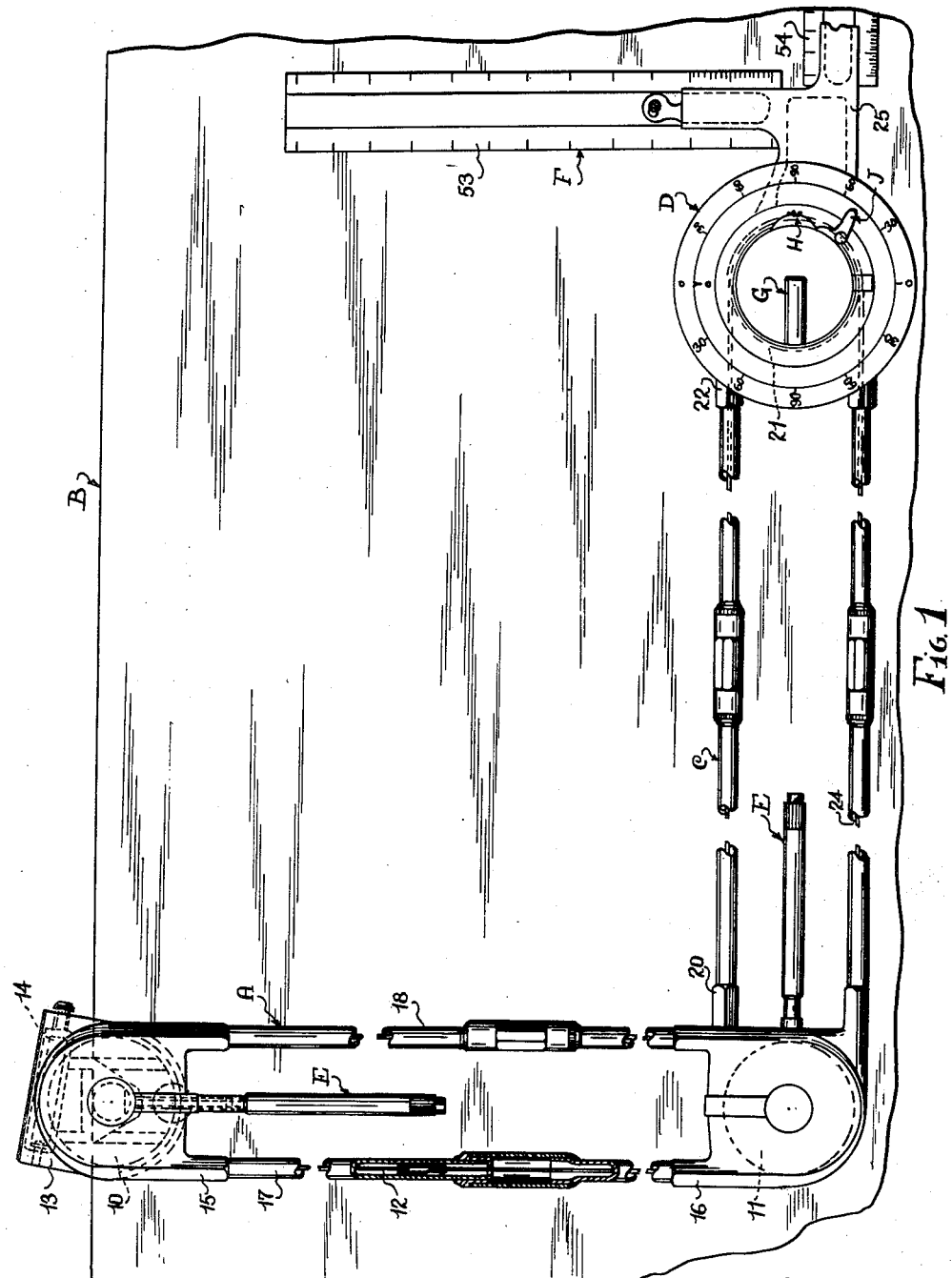

The drafting machine shown in Figs. 1 to 8 of the drawings, which is the preferred embodiment of the invention, comprises a two-section, parallel motion mechanism or arm of the wheel and band type having one end adapted to be detachably connected to a drawing board and the other end which is adapted to be moved about the drawing board provided with a protractor or instrument head built into the parallel motion wheel at the free end of the arm. Alternatively the protractor or instrument head can be made as a separate unit and attached to the parallel motion wheel at the free end of the arm. The parallel motion mechanism or arm shown comprises two angularly movable sections, each comprising a pair of wheels of equal diameter encircled by a flexible band; however, any number of sections may be employed.

The upper or anchor section of the parallel motion arm comprises wheels 10, 11 encircled by an endless band 12 and held in spaced relation by an expandible strut A operatively connected thereto for relative rotation with respect to the strut. The upper wheel 10 is formed integral with a member 13 pivotally connected to a bracket member 14 forming a part of the anchor assembly, which bracket member is adapted to engage over the upper edge of the drawing board, designated generally by the reference character B, and be detachably fixed thereto by a clamp screw located underneath the drawing board.

The strut A comprises yoke or yoke members 15, 16 located at the anchor and elbow ends, respectively, and connected together and held in spaced relation by tubular side portions or members 17, 18. The anchor yoke 15 is rotatably connected by anti-friction bearings to the member 13 in such a manner that the strut A is supported for rotation about the center of the wheel 10 as an axis. The yoke 16 at the elbow of the arm is pivotally connected to the wheel 11 for rotation about the center thereof as an axis. The wheel 11 is formed integral and concentric with a wheel, not shown, forming a part of the protractor section of the parallel motion arm, that is, the section adjacent to the protractor head and rulers, etc. The two yoke members 16, 20, the latter being the yoke member of the strut C of the protractor section at the elbow of the arm, are pivotally connected with respect to each other and the wheel assembly at the elbow of the arm by anti-friction bearings in a manner similar to that in which the yoke 15 is rotatably connected to the wheel 10.

The protractor section of the parallel motion arm comprises, in addition to the wheel located at the elbow, previously mentioned, a wheel 21 of equal diameter therewith and held in spaced relation with respect thereto by the strut C. The strut C is similar in construction to the strut A and includes a yoke member 22 to which the wheel 21 is pivotally connected by an anti-friction bearing 23, see Figs. 3 and 4. The wheels of the protractor section of the arm are encircled by an endless band 24 similar to the band 12. In the embodiment shown, the wheel 21 located at the free end of the parallel motion arm forms a part of the instrument head, designated generally as D, or, conversely, the instrument head is a part of the parallel motion arm. Alternatively, the instrument head may be constructed as a separate unit and detachably secured to the wheel 21.

The parallel motion mechanism is not herein shown and described in detail but is similar to that disclosed and claimed in United States Patent No. 2,519,143 issued August 15, 1950, on my copending application Serial No. 649,861, filed February 25, 1946, entitled "Drafting Machine," and comprises individual counterpoise means E for each section thereof.

Generally speaking, the instrument head D shown comprises an instrument or ruler assembly F including an instrument holding member or ruler chuck arm 25 adjustably connected by clamp mechanism to a spindle 26 rotatably supported in the parallel motion wheel 21 at the free end of the parallel motion mechanism coaxially with respect to the wheel 21; index mechanism H for indexing the ruler or instrument assembly with respect to the wheel 21; clamp mechanism J for clamping the ruler assembly in any desired angular position with respect to the wheel 21; and a protractor assembly for indicating the angular position of the ruler assembly. The protractor shown comprises a normally stationary, graduated protractor ring or element 29 formed integral with the member or assembly within which the instrument assembly is rotatably supported which, in the embodiment shown, is the wheel member 21. If desired, the protractor ring 29 may be made as a separate element and adjustably fixed with respect to the wheel 21 for the purpose of changing the angle of the base or reference line of the drawing, etc. In addition to the protractor ring 29, the wheel member 21 comprises a radially inwardly extending flange 30 formed integral therewith and to which flange the movable protractor element or plate 31 is adapted to be clamped by the protractor clamp assembly J.

Figure 5:
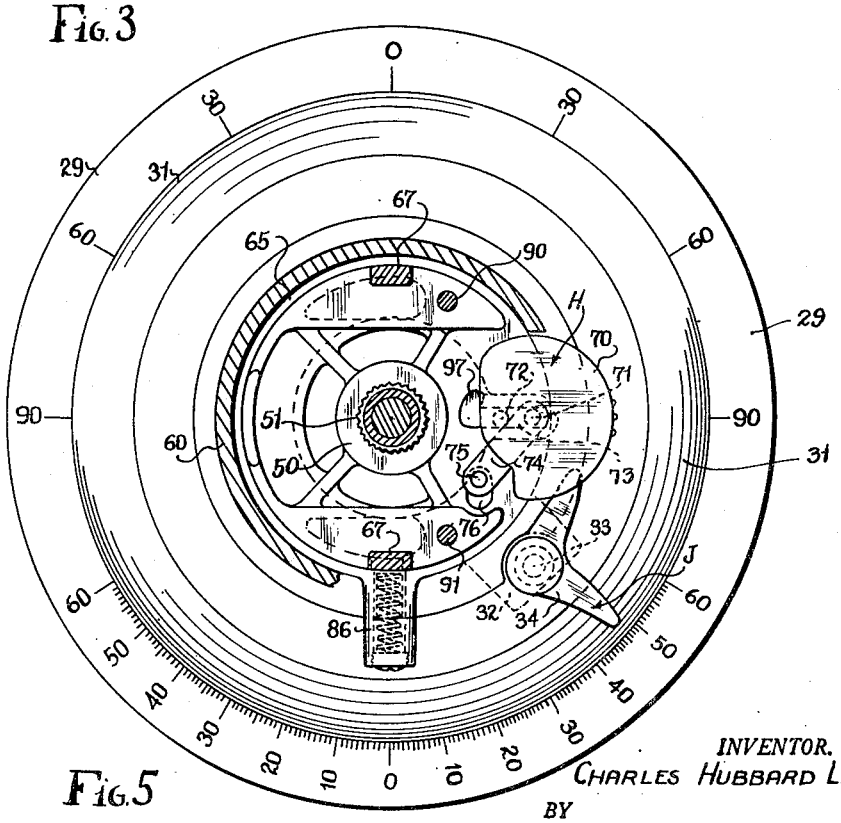
Fig. 5 is a sectional view approximately on the line 5—5 of Fig. 3.
Figure 6:
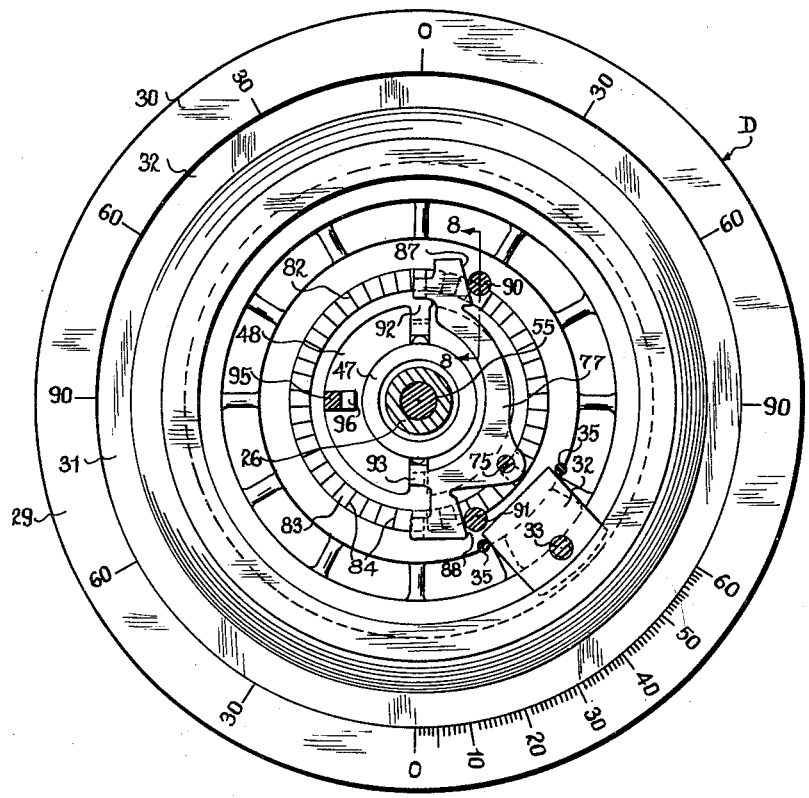
Fig. 6 is a sectional view approximately on the line 6—6 of Fig. 3.
Figure 7:
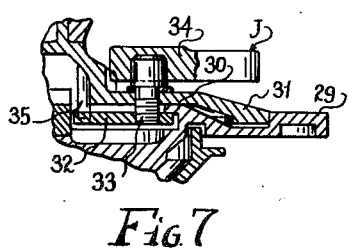
Fig. 7 is a fragmentary sectional view, with portions in elevation, approximately on the line 7—7 of Fig. 2.
Figure 8:
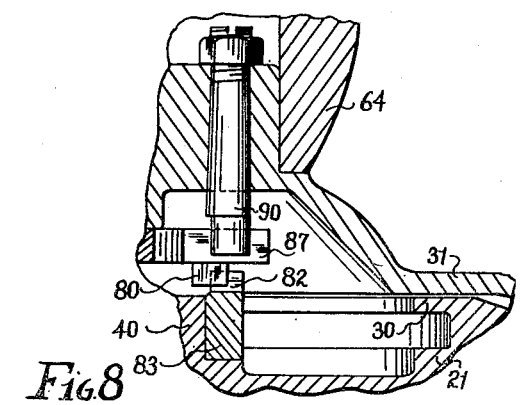
Fig. 8 is a fragmentary sectional view, with portions in elevation, approximately on the line 8—8 of Fig. 6.

The clamp J shown comprises a clamp member 32 located underneath the movable protractor element or plate 31, see Figs. 6 and 7, and threaded upon the lower end of a screw 33 projecting through a suitable aperture in the protractor plate 31. The head of the screw 33 which is located above the protractor plate 31 is knurled and provided with a bell crank-like handle or toggle member 34 for facilitating rotation thereof. The radial outer end of the clamp member 32 extends underneath the flange 30 on the wheel member 21 and the inner end thereof engages between two downwardly extending projections 35 on the underside of the protractor plate 31, which projections limit the rotation of the clamp member 32 about the screw 33. The construction is such that when the screw 33 is rotated in a clockwise direction, as viewed in Fig. 5, the flange 30 is securely clamped between the clamp member 32 and the undersurface of the protractor plate 31. Rotation of the screw 33 in the opposite direction unclamps the parts and permits rotation of the movable protractor plate 31 relative to the stationary protractor element 29 and the wheel 21. The stationary protractor element or ring 29 is located circumferentially of the movable protractor plate or element 31 and the construction is such that the adjoining portions thereof are flush. The movable protractor element 31 is provided with a dead line 36 and a vernier scale 37 for cooperation with a graduated scale 38 on the stationary protractor element or ring 29.

The spindle 26 is rotatably supported in the hub 40 of the wheel 21 by a pair of antifriction bearings 41, 42, the outer races of which abut each other and are held within the hub 40 by threaded rings 43, 44 located in suitably threaded counterbores in opposite ends of the hub. The antifriction bearings 41, 42 are assembled upon the spindle 26 from the top and the inner race of the antifriction bearing 42 abuts against a flange 46 formed upon the shaft or spindle 26 adjacent to the lower end thereof and the upper end of the inner race of the bearing 41 is engaged by the lower end of a sleeve-like member 47 pressed upon the spindle 26 above the bearing 41 and provided with a circumferential flange 48 intermediate the ends thereof. The upper end of the sleeve-like member 47 is engaged by the undersurface of the hub portion 50 of the movable protractor element or plate 31, which plate is fixedly pressed upon a knurled portion 51 of the spindle 26 and held assembled therewith by a nut 52 having threaded engagement with a threaded portion of the spindle 26 adjacent to the upper end thereof. The antifriction bearings 41, 42, the sleeve-like member 47 and the protractor plate 31 are assembled upon the spindle 26 from the upper end and are all held in assembled position by the nut 52 which clamps the same securely therebetween and the flange 46 adjacent to the lower end of the spindle.

The instrument holding plate or chuck arm 25 to which the rulers 53, 54 are detachably connected is rotatably connected to the lower end of a pin or rod 55 extending upwardly through the spindle 26 and having an enlarged head 56. The plate is adapted to be clamped to the lower end of the spindle 26 in any predetermined adjusted position by a dish-shaped plate or washer-like resilient member 57 secured to the lower end of the spindle 26 by a flange 58 on the spindle which is spun or peened over the member 57 after it has been assembled with the spindle. The perimeter of the member 57 engages against a circular shoulder 59 formed in the upper surface of the plate 25 by a counterbore therein.

The plate or chuck arm 25 is adapted to be raised, as viewed in Fig. 5, to tightly engage the circumference of the member 57 against the shoulder 59 and thus clamp the plate or chuck arm 25 to the lower end of the spindle 26 by manipulation of a lever 60 pivotally connected to the bifurcated upper end of the rod 55 by a pin 61. The lever 60 shown is made of a plastic and comprises a metal insert 62 molded therein, which member is provided with a cam-like surface 63 adapted to engage the upper end of the spindle 26 and draw the rod 55 in an upward direction when the lever is in the position shown in Fig. 3. The lever 60 is located in a cut-out portion in the hand grasp or handle proper 64 counterbored from the bottom to receive an upwardly extending flange 65 on the protractor element 31 to which the handle is secured by a plurality of setscrews 66 threaded into bosses 67 on the top of the flange. When the lever 60 is in position to clamp the chuck arm to the spindle 26, it is preferably flush with the surface of the handle proper. When the lever 60 is rotated in a clockwise direction, as viewed in Fig. 3, the rod 55 is free to move downward under the resiliency of the member 57 a limited amount, which amount is sufficient to permit relatively free rotation between the chuck arm 25 and the member 57, thus permitting adjustment of the rulers or other instruments, as the case may be, carried by the chuck arm to any desired base or reference line on the drawing or the like.

One of the principal advantages of the construction just described for clamping and unclamping the instrument holding member or ruler chuck arm 25 to and from the spindle 26, in addition to its simplicity of construction and ease of operation, is the fact that it is positive in operation and the tightening of the clamp has no tendency to alter the alignment of the rulers, etc. The cam-shaped end 63 of the lever 60 is such that the resiliency of the member 57 tends to hold it in either clamping or unclamping position. The lever 60 is normally parallel with the upper edge of the drawing board and the radially outer end preferably projects beyond the handle proper so that it can be raised by the little finger of the operator while the palm of the hand remains above the hand grasp 64.

The indexing mechanism H shown comprises an index pawl releasing member or thumb piece 70 slidably supported on the protractor plate 31 and projects outwardly from one side of the handle 64 through aligned apertures in the flange 65 and the handle. The thumb piece 70 is provided with a pair of downwardly projecting pins 71, 72 positioned radially with respect to each other and having their lower ends engaged within a radial slot 73 in the protractor plate 31. The pin 71 has pivotally connected thereto one end of a lever 74 movably supported upon the upper surface of the member 31 underneath the handle 64. The opposite end of the lever 74 is provided with a pin 75 fixed thereto, which pin projects downward through an elongated slot 76 in the member 31 where it is connected to an indexer or index notcher or pawl member 77 slidably supported on the flange 48 of the sleeve-like member 47 to the right of the spindle 26, as viewed in Figs. 3 and 6. The member 77 encircles a portion of the spindle 26 and opposite ends thereof are provided with downwardly extending projections 80, 81 which engage in diametrically opposite, face-type slots or ratchet teeth 82 formed in the upper end of a sleeve or ring-like member 83 pressed upon the cylindrical hub 40 of the wheel 21. The sides 84 of the slots 82 form gauging or locating surfaces on the wheel assembly for the indexing, as will be hereinafter apparent.

Figure 2:
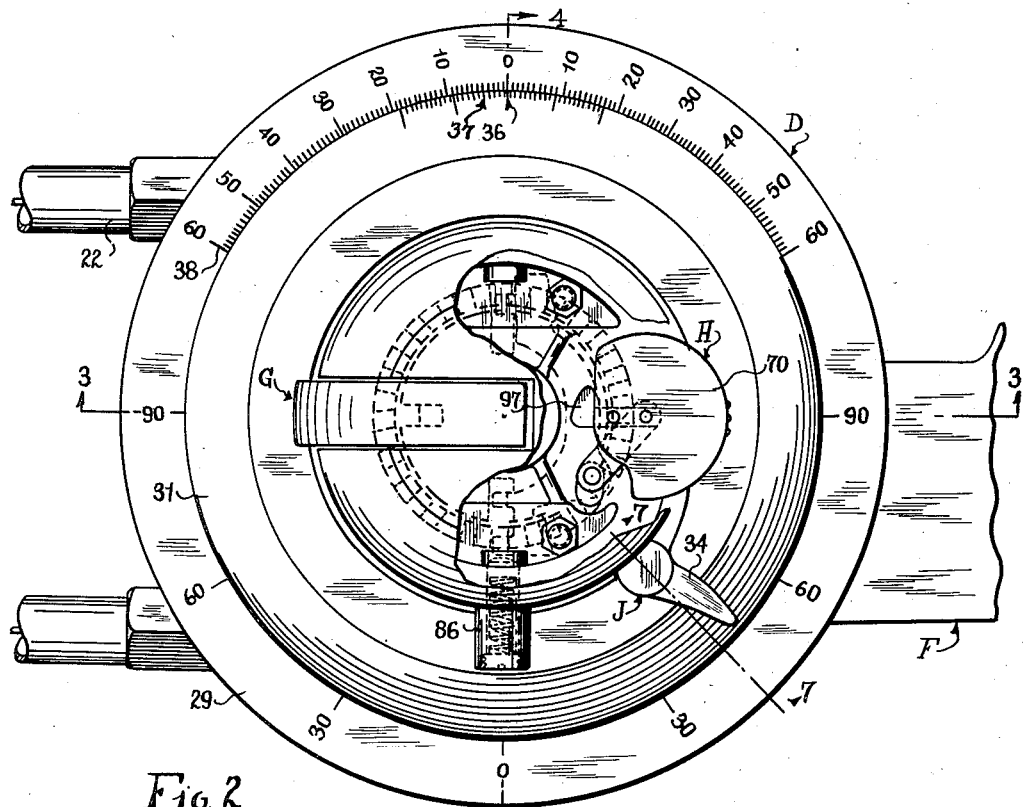
Fig. 2 is an enlarged plan view of the drafting head, with a portion of the handle proper broken away.
Figure 4:
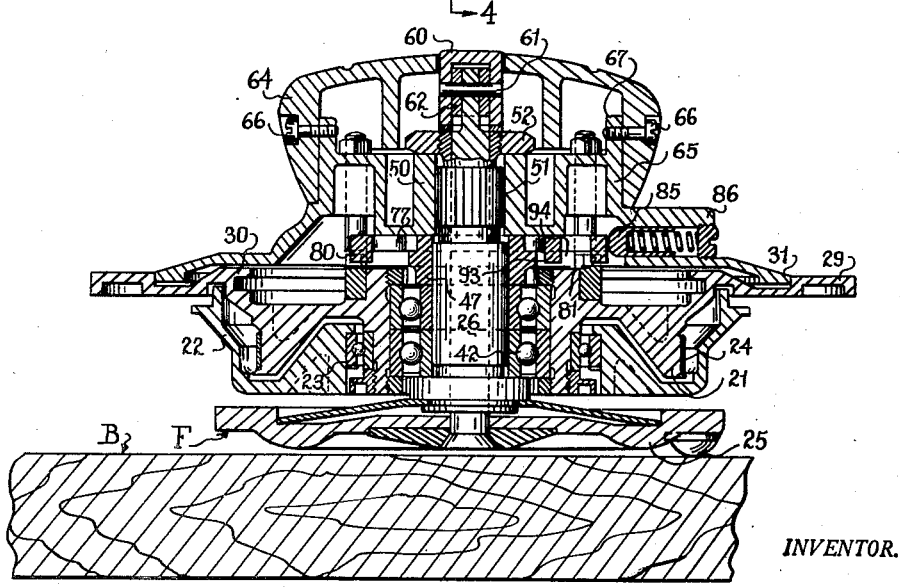
Fig. 4 is a sectional view, with portions in elevation, approximately on the line 4—4 of Fig. 2.

The index notcher member 77 is continuously urged toward the rear or upper edge of the drawing, as viewed in Figs. 2, 5 and 6, or, toward the left, as viewed in Fig. 4, by a spring-pressed detent 85 slidably supported in a boss 86 formed integral with the protractor plate 31. The opposite ends of the index notcher 77 are provided with inclined or cam-like surfaces 87, 88 adapted to normally engage the lower ends of pins 90, 91, respectively, detachably connected to the protractor plate 31. Like the sides 84 of the slots 82, the surfaces of the pins 90, 91 form gauging or locating surfaces on the ruler assembly for the indexing. The construction is such that as the index notcher member 77 is urged in the direction previously mentioned by the spring-pressed detent 85, the inclined surfaces 87, 88, both of which are inclined in the same direction, cause the notcher member 77 to be pushed toward the left, as viewed in Fig. 6, thus tightly wedging and clamping the downwardly extending projections 80, 81 on the member 77 with the left-hand sides or gauging surfaces 84 of diametrically opposite index slots 82.

The effect is to wedge the member 77 between a selected pair of the gauging surfaces 84 on the wheel assembly, which is the normally stationary member, and the gauging surface or surfaces (pins 90, 91) on the ruler assembly. It will be apparent to those skilled in this art that the inclined or cam surfaces 87, 88 may be different parts of a continuous surface extending from one side of the axis of rotation of the ruler assembly to the other and the pins 90, 91 arranged accordingly and in some types of indexing devices it may be advantageous to so construct the parts. In like manner, the surfaces of the pins 90, 91 which cooperate with the surfaces 87, 88 may be different areas of a continuous surface. It will be further apparent that the inclined or cam surfaces which produce the wedging effect between the gauging or locating surfaces on the respective parts to be indexed may be other than on the notcher or movable member 77 so long as the notcher or movable member is wedged between gauging surfaces on both of the relatively rotatable or indexible members; for example, inclined or wedged surfaces may be substituted for the circular pins 90, 91 shown, in which event the contacting surface or surfaces of the notcher member may lie in a plane or planes parallel to its direction of movement. As a further alternative construction, the wedging action may be obtained by suitably constructing the cooperating gauging or locating surfaces on the notcher member and the wheel or stationary assembly.

As a still further alternative construction, the indexing mechanism may be so arranged that the notcher member is movable parallel to the axis of rotation between the relatively rotatable or indexible members into and out of wedging engagement with gauging or locating surfaces on the respective members to be indexed as distinguished from the transverse movement of the notcher member shown. A construction embodying the last mentioned modification is shown in Figs. 9 to 12 of the drawings, hereinafter specifically described.

The arrangement and construction of the indexing mechanism of the present invention are such that the center about which the two members rotate relative to each other is eliminated as a factor respecting the accuracy of indexing; in other words, the center bearing does not have any gauge or locating function. This elimination of the center as a factor in the indexing of the parts relative to each other and the locating of the gauging or locating surfaces adjacent to the circumference of the indexing ring or member in the manner herein disclosed gives a maximum gauge or locating length for any given size of indexing ring and one which is twice that of a construction wherein the axis of rotation between the members has a locating function. In addition, the elimination of the locating function of the center of rotation between the members to be indexed eliminates all errors due to eccentricity between the axis of relative rotation between the members and the center of indexing, that is, the center of the annularly arranged, locating or gauging points.

Referring again to the embodiment disclosed in Figs. 1 to 8, inclusive, the ruler assembly is located in its various positions by the engagement of the locating surfaces on the projections 80, 81 with the diametrically or substantially diametrically opposite locating surfaces 84 formed by the sides of the index slots 82 and the locating surfaces 87, 88 with the pins 90, 91 and the accuracy with which the ruler assembly is indexed depends solely upon the accuracy with which the locating surfaces 84 on the wheel assembly are made with respect to each other; for example, if two pairs of locating surfaces 84 are made exactly 90 degrees with respect to each other, the ruler assembly will be indexed exactly 90 degrees when the index notcher member 77 is moved from one pair of locating surfaces to the other irrespective of eccentricity between the axis of rotation of the ruler assembly and the center about which the locating surfaces are arranged.

Preferably, the positions of the locating surfaces formed by pins 90, 91 are adjustable so that in assembling the drafting machine, the notcher member 77 can be positioned to cause the dead line 36 to register exactly with any of the numerals of the scale 38 which indicate indexing settings. In the embodiment shown, this adjustment is obtained by forming heads, i. e., the portions of the pins engaged by the notcher member, eccentric to the pins proper, as may be seen by reference to Fig. 8, and by rotating the pins the heads thereof can be moved laterally relative to the notcher member. The upper ends of the pins 90, 91 are slotted to receive a screw driver by which the pins can be rotated to effect the adjustment, and a lock-nut is provided for locking the pins in their adjusted positions. This construction is clearly shown in Fig. 8 wherein only the pin 90 is shown, however, pin 91 is of like form.

The fact that the notcher member 77 is wedged between gauging or locating surfaces on the respective members to be indexed eliminates all errors due to any lost motion originally present between the members or produced by wear. Any wear which takes place between the gauging or locating surfaces is evenly distributed at opposite sides of the center of rotation of the ruler assembly and does not effect the accuracy with which the ruler assembly is indexed. The fact that lost motion and eccentricity between the axis of rotation of the ruler assembly and the annular series of gauging or locating surfaces on the supporting member or wheel assembly are eliminated facilitates manufacture and assembly and permits the device to be manufactured by people less skilled than ordinarily employed in the manufacture of precision devices of the character referred to. As shown, the index ring 83 projects above the hub 40 of the wheel 21 and after the index ring has been pressed on the hub, the gauging or locating surfaces 84 can be accurately formed by merely passing a grinding wheel through diametrically opposite slots 82 in a continuous movement. Among other advantages, this tends to eliminate errors caused by wear of the grinding wheel.

When the thumb piece 70 is depressed, movement of the lever 74 causes the pin 75 to travel along the slot 76 and move the index pawl 77 transversely of the axis of rotation of the instrument assembly against the spring-pressed detent 85 until the downwardly extending projections 80, 81 are clear of the index stops, whereupon the ruler assembly including the movable protractor element 31, may be rotated with respect to the wheel 21 and the stationary protractor element 30. When the downwardly extending projection 80 is moved to inoperative position, it engages within a slot 92 in the flange 48 of the member 47 which assists in guiding the index pawl. The pawl is also guided by a downwardly extending projection 93 formed on the opposite end thereof, which projection normally engages within a slot 94 in the flange 48 similar to the slot 92. In the embodiment shown, index slots 82 are spaced at fifteen degree intervals and facilitate setting the rulers, etc., to these angles. Obviously the indexing mechanism H may be omitted or the index slots may be located at any desired places or angles.

Figure 3:
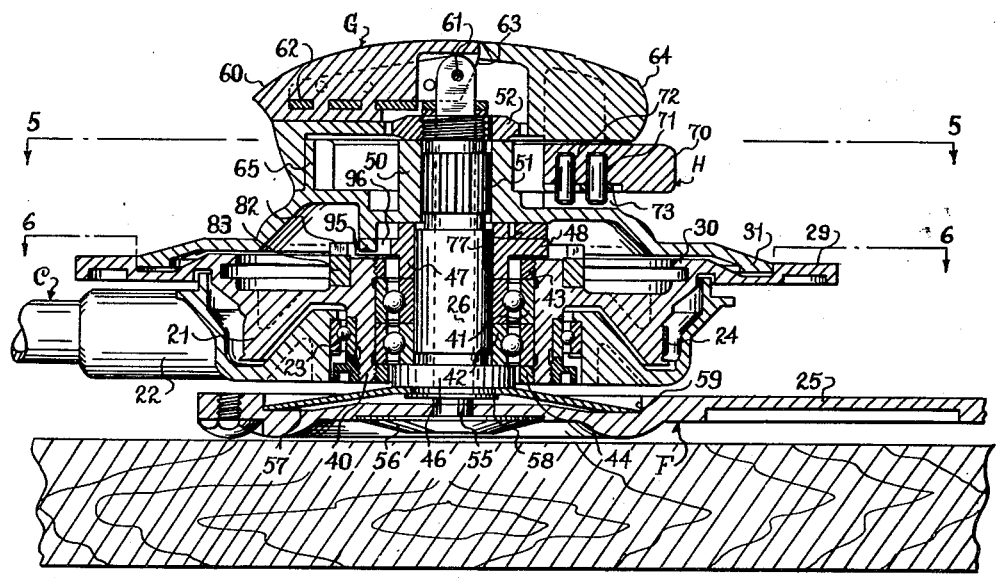
Fig. 3 is a sectional view, with portions in elevation, approximately on the line 3—3 of Fig. 2.

As previously mentioned, the protractor plate 31 is preferably assembled with the spindle 26 from the top after the bearings 40, 41 and the member 47 are assembled thereon and the projection 95 on the underside of the protractor plate shown in Figs. 3 and 6 and which extends into a slot 96 in the flange 48 of the member 47 merely assists in locating the members during assembly.

Provision is made for locking the index notcher member in inoperative position when it is not desired to use it. For this purpose the inner end of the slot 73 is provided with a portion 97 extending rearwardly at an acute angle to the length of the slot proper, into which portion the lower end of the pin 72 can be engaged by depressing and then rocking the thumb piece 70 about the pin 71 as a pivot.

The protractor or instrument head D' shown in Figs. 9 to 12 is similar to the head D except as hereinafter pointed out and the duplicate parts are designated by the same reference characters. The index notcher member 100 corresponding with the notcher member 77 of the previous embodiment comprises a ring-like body portion having two integral, radially projecting, circular pins 101, 102 at its opposite sides. The notcher member 100 is slidably supported for movement longitudinally of the axis of rotation of the ruler assembly F' by the hub 103 of the member 104 corresponding to the member 31 but of slightly different form to accommodate the different indexing mechanism. The hub 103 of the member 104 is forced pon the knurled portion of the shaft or spindle 105 similar to the shaft 26 except for the length of the reduced section immediately below the knurled portion which is longer in the present embodiment than in the embodiment previously described. The hub 103 is interposed between the nut 52 on the upper end of the spindle 105 and the upper surface of a flanged member 106 which replaces the member 47 of the previous embodiment. The parts 104, 106 are held in assembled relationship together with the inner races of the anti-friction bearings 41, 42 by the nut 52.

The outer ends of the pins 101, 102 of the notcher member 100 correspond with the projections 80, 81 and surfaces spaced inwardly from the end with the locating surfaces 87, 88 of the notcher member 77. The pins 101, 102 cooperate with gauging surfaces 107, 108 on an axially extending flange 109 of the member 106 and gauging surfaces formed by the sides of the index slots 110 in the upper edge of the index ring member 111, which slots are similar to and otherwise correspond with the index slots 82 previously referred to. The index ring 111 is similar to the ring 83 but longer, is preferably made in the same way as the ring 83 and secured to the wheel member 21 in the same manner.

The gauging surfaces 107, 108 are formed by tapered sides of slots 112, 113 in the upper edge of the axial flange 109 on the member 106, which flange lies immediately inside of the index ring 111. The flange 109 in which the slots 112, 113 are formed extends axially further than the index ring 111 so that the indexer member 100 may be moved axially a sufficient distance to raise the pins 101, 102 clear of the index ring 110 and thus permit the ruler assembly F' to be indexed relative to the index ring 111 without the index notcher, or, more properly, the pins 101, 102 thereof from becoming disengaged from the slots 112, 113.

The notcher member 100 is continuously urged in a direction to engage the pins 101, 102 thereof within diametrically opposite slots 110 of the index ring 111 by a compression type coil spring 114 interposed between the upper surface of the notcher member and the bottom of an annular groove 115 in the hub 103 of the member 104. The notcher member 100 is adapted to be manually raised when it is desired to index the ruler assembly F' relative to the supporting arm or wheel member 21 by pairs of cooperating cam surfaces 116, 117 on the underside of the notcher member 100 and the upper side of a rotatable cam member 118 located underneath the notcher member and supported for rotation about the lower portion of the hub 103 of the member 104. Any desired number of pairs of cooperating cam surfaces 116, 117 may be employed. The present embodiment comprises three pairs uniformly spaced about the axis of rotation of the ruler assembly F'. A bearing member 120 interposed between the lower side of the cam member 119 and the upper surface of the member 106 facilitates rotation of the cam member.

Figure 9:
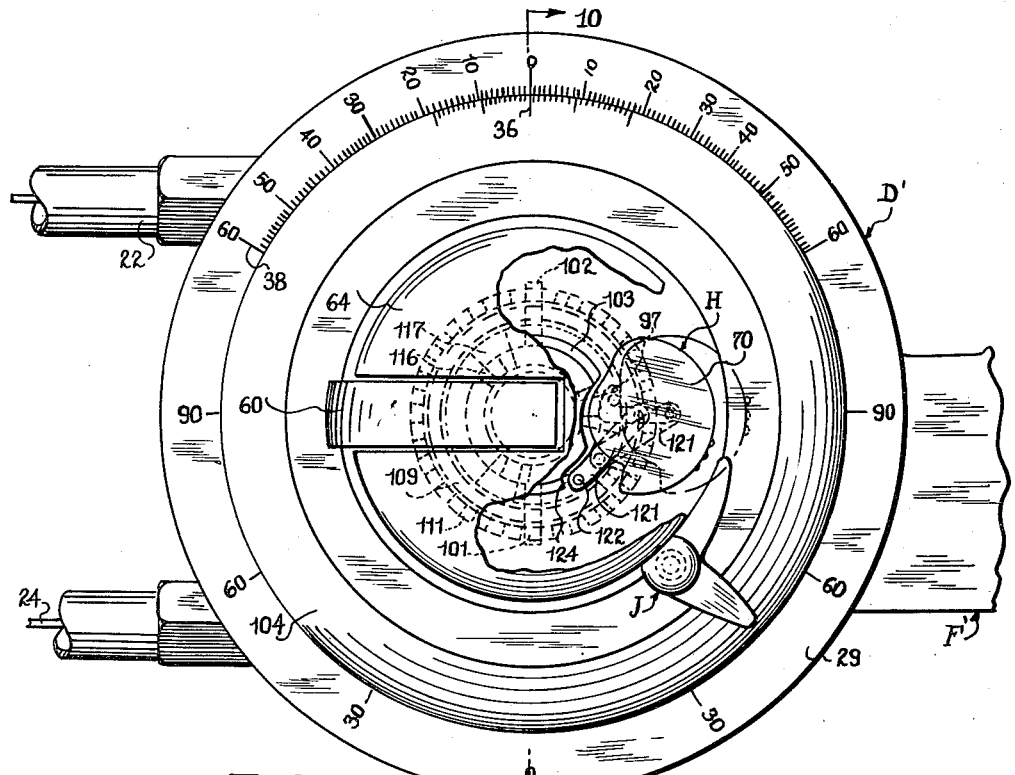
Fig. 9 is a plan view similar to Fig. 2, but showing a modified construction.
Figure 10:
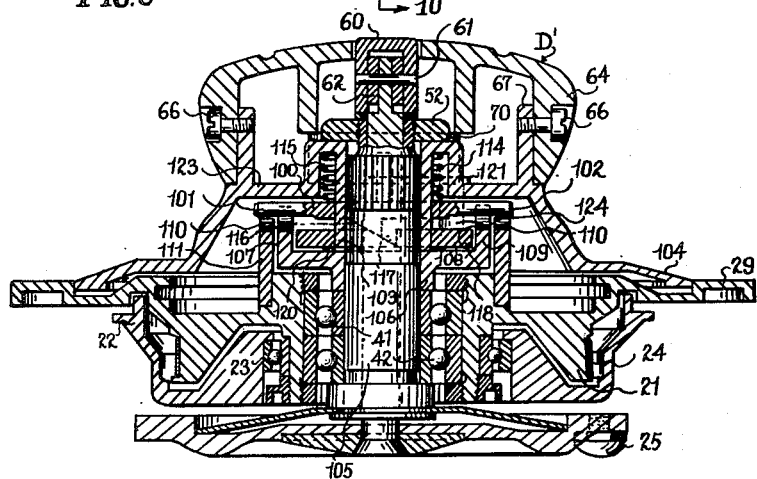
Fig. 10 is a sectional view approximately on the line 10—10 of Fig. 9.

The cam member 118 is continuously urged in a counterclockwise direction, as viewed in Fig. 9, that is, in a direction to permit the pins 101, 102 of the notcher member to engage within a pair of grooves or notches 110 in the index ring 111 by the spring 114 and the cooperating cam surfaces 116, 117, the inclination of which is such that the surfaces are not self-locating but will normally rotate the cam member 118 in the direction referred to.

The cam member 118 is adapted to be rotated in a clockwise direction, as viewed in Fig. 9, to raise the indexer member 100 through the co-action of the cam surfaces 116, 117 upon inward movement of the thumb piece 70 to which it is connected by a lever 121 and a pin or post 122. The lever 121 is slidably supported upon the upper surface of the web 123 of the member 104, replaces the lever 74 of the previous embodiment, and is connected to the thumb piece in a similar manner. The left-hand end of lever 121, as viewed in Fig. 9, is pivotally connected to the upper end of the post 122, which post extends upwardly through a slot 124 in the web 123 and is fixedly secured to the cam member 118 at its lower end. A portion of the hub 103 of the member 104 is cut away, as clearly shown in Fig. 9, to permit movement of the thumb piece 70, which thumb piece is the same as the thumb piece of the prior embodiment, moves in the same manner and can be locked in the same way to maintain the indexer member 100 in inoperative position.

Figure 11:
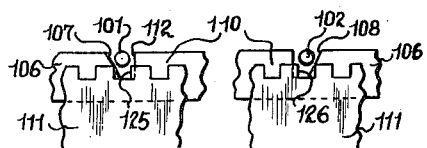
Fig. 11 is a fragmentary side elevational view looking at the index ring from the right of Fig. 10.
Figure 12:
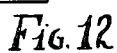
Fig. 12 is a fragmentary side elevational view looking at the index ring from the left as viewed in Fig. 10.

The ruler assembly F' is located in its various positions by the engagement of the outer ends of the pins 101, 102 with the dimetrically or substantially diametrically opposite locating surfaces 125, 126, see Figs. 11 and 12, formed by the axial sides of the index slots 110 and the locating surfaces 107, 108. The accuracy with which the ruler assembly is indexed depends solely upon the accuracy with which the locating surfaces 125, 126 on the wheel assembly, that is, the slots 110, or, more particularly, the sides thereof are made with respect to each other; for example, if two pairs of locating surfaces on the index ring 111 are exactly 90 degrees apart with respect to each other, the ruler assembly will be indexed exactly 90 degrees when the index notcher 100 is moved from one pair to the other irrespective of the eccentricity of the axis of rotation of the ruler assembly and the center of the indexing surfaces. The other advantages heretofore enumerated with respect to the embodiment shown in Figs. 1 to 8 are present in this embodiment to the same extent.

From the foregoing disclosure, it will be apparent that the objects of the invention heretofore enumerated and others have been accomplished and that there has been provided a novel and improved indexing means of general application as well as a novel and improved drafting machine and instrument head for drafting machines and the like. While the preferred embodiments of the invention have been described in considerable detail, I do not wish to be limited to the particular constructions shown which may be varied within the scope of this invention and it is my intention to cover hereby all adaptations, modifications and uses thereof which come within the practice of those skilled in the

Having thus described my invention, I claim:

1. In a drafting or like device, the combination of a member having a series of index notches or slots arranged in a circle the sides of which notches form index or locating surfaces, a ruler or instrument assembly rotatably supported by said member and provided with a plurality of locating surfaces, and an indexer member operatively connected to said ruler assembly and engageable with said locating surfaces thereon and reciprocable transversely of the axis of rotation of said ruler assembly to selectively engage and disengage diametrically opposite index surfaces formed by said notches.

2. In a drafting or like device, the combination of a member having a series of index notches or slots arranged in a circle the sides of which notches form index or locating surfaces, a ruler or instrument assembly rotatably supported by said member and provided with a plurality of locating surfaces, a unitary indexer member operatively connected to said ruler assembly and having locating surfaces on one side thereof engageable with said locating surfaces on said ruler assembly and locating surfaces on the opposite side thereof selectively engageable with a selected pair of said locating surfaces on said member formed by generally diametrically opposite notches, and means for moving said indexer member in opposite directions longitudinally of the axis of rotation of said ruler assembly to selectively engage and disengage said second-mentioned surfaces on said indexer member with a selected pair of said diametrically opposite index surfaces formed by said notches, a plurality of said locating surfaces being inclined with respect to the direction of movement of said indexer member and said locating surfaces on opposite sides of said indexer member having parts spaced from each other in the direction normal to the direction of movement of said indexer member a distance greater than the minimum distance between said locating surfaces on said ruler assembly and a selected pair of said locating surfaces on said first mentioned member to wedge said indexer member between said locating surfaces on said first mentioned member and said ruler assembly when said indexer member is moved into engagement therewith and prevent rotation of said ruler assembly relative to said first mentioned member in opposite directions.

3. In a drafting or like device, the combination of a member having a series of index notches or slots arranged in a circle the side of which notches form locating surfaces, a ruler or instrument assembly rotatably supported by said member and having a pair of locating surfaces thereon, an indexer member carried by said instrument assembly and movable transversely of the axis of rotation of said instrument assembly into and out of wedging engagement with said locating surfaces on said assembly and a pair of locating surfaces formed by the sides of two selected diametrically opposite notches, resilient means for continuously urging said indexer member in a direction to engage within said notches, manually operable means for moving said indexer member comprising a thumb piece slidably supported in said ruler assembly and operative when depressed to withdraw said indexer member from said notches, and means for retaining said thumb piece in depressed position upon rotation thereof when depressed.

4. In a drafting or like device, the combination of a member having a series of index notches or slots arranged in a circle the side of which notches form locating surfaces, a ruler or instrument assembly rotatably supported by said member and having a pair of locating surfaces thereon, a unitary indexer member carried by said instrument assembly and movable axially of the axis of rotation of said instrument assembly said indexer member having a pair of locating surfaces on one side thereof with said locating surfaces on said assembly and a pair of locating surfaces on the opposite side thereof selectively engageable with a pair of said locating surfaces on said first mentioned member formed by the sides of two selected diametrically opposite notches, resilient means for continuously urging said indexer member in a direction to engage within said notches, manually operable means for moving said indexer member comprising a thumb piece slidably supported in said ruler assembly and operative when depressed to withdraw said indexer member from said notches, and means for retaining said thumb piece in depressed position upon rotation thereof when depressed, a plurality of said surfaces being inclined with respect to the direction of movement of said indexer member and said pairs of locating surfaces on opposite sides of said indexer member having parts spaced from each other in the direction normal to the direction of movement of said indexer member a distance greater than the minimum distance between said locating surfaces on said ruler or instrument assembly and a selected pair of said locating surfaces on said first mentioned member to wedge said indexer member between said abutments when said indexer member is moved into engagement therewith and prevent rotation of said ruler or instrument assembly relative to said member in opposite directions.

5. In a drafting or like device, the combination of a member having a series of index or locating surfaces arranged in a circle, an instrument assembly rotatably supported by said member, an indexer member reciprocable transversely of the axis of rotation of said instrument assembly to selectively engage and disengage diametrically spaced locating surfaces, yieldable means for continuously urging said indexer member in a direction to engage said locating surfaces, said indexer member having cam surfaces adjacent to opposite ends thereof, adjustable abutments on said instrument assembly adapted to be engaged by said cam surfaces to force opposite ends of said indexer member against said locating surfaces when said indexer member is moved in one direction, manually operable means comprising a thumb piece slidably supported in said ruler assembly for moving said indexer member in a direction to disengage said locating surfaces and means for selectively locking said thumb piece in position to maintain said indexer member in disengaged position.

6. In a drafting or like device, the combination of a member having a series of index abutments or locating surfaces arranged in a circle, an instrument assembly rotatably supported concentric with the center of said series of surfaces, an indexer member reciprocable transversely of the axis of rotation of said instrument assembly to selectively engage and disengage diametrically opposite locating surfaces, yieldable means for continuously urging said indexer member in a direction to engage said locating surfaces, said indexer member having cam surfaces adjacent to opposite ends thereof, adjustable pin-like members connected to said instrument assembly and provided with eccentric heads adapted to be engaged by said cam surfaces to force opposite ends of said indexer member against said locating surfaces when said indexer member is moved in one direction, manually operable means comprising a thumb piece slidably supported in said ruler assembly for moving said indexer member in the opposite direction to disengage said locating surfaces, and means for selectively locking said thumb piece in position to maintain said indexer member in disengaged position.

7. In combination, two relatively rotatable members, one of said members having locating abutment means thereon, the other of said members having a plurality of locating abutment means thereon each providing a pair of spaced contact points located at opposite sides of a normal from a plane connecting the same and passing through the axis of relative rotation between said members, a unitary indexer member having locating abutment means on one side thereof engageable with said abutment means on the first of said relatively rotatable members and a second locating abutment means on the opposite side thereof selectively engageable with a pair of said spaced contact points of one of said abutment means on the second of said relatively rotatable members, and means for moving said indexer member to move said second abutment means thereon into and out of engagement with said spaced contact points of a selected one of said abutment means on the second of said relatively rotatable members, one of said abutment means having a surface inclined with respect to the direction of movement of said indexer member and said abutment means on opposite sides of said indexer member having parts spaced from each other in the direction normal to the direction of movement of said indexer member a distance greater than the minimum distance between said abutment means on the first of said relatively rotatable members and said spaced contact points of a selected one of said abutment means on the second of said relatively rotatable members to wedge said indexer member between said abutment means on said relative rotatable members when in engagement therewith and prevent rotation of said relatively rotatable members in opposite directions.

8. In combination, two members relatively rotatable about a common axis, one of said members having locating abutment means thereon providing spaced gauge points, the other of said members having a plurality of locating abutment means thereon each providing a pair of spaced gauge points on opposite sides of a normal from a plane connecting the same and passing through said axis, a unitary indexer member having locating abutment means on one side thereof engageable with said abutment means on the first mentioned of said relatively rotatable members and a second locating abutment means on the opposite side thereof selectively engageable with a pair of said spaced gauge points of one of said abutment means on the second mentioned of said relatively rotatable members, and means for moving said indexer member to move said second abutment means thereon into and out of engagement with said spaced gauge points of a selected one of said abutment means on said second mentioned relatively rotatable member, one of said abutment means being inclined with respect to the direction of movement of said indexer member and said abutment means on opposite sides of said indexer member having parts spaced from each other in the direction normal to the direction of movement of said indexer member a distance greater than the minimum distance between said abutment means on the first of said relatively rotatable members and said spaced gauge points of a selected one of said abutment means on the second of said relatively rotatable members and operative to cam said indexer member against one of the pair of spaced gauge points engaged thereby to tend to produce relative rotation between said two members in one direction and against the other gauge point of said one pair of spaced gauge points to tend to produce relative rotation between said two members in the opposite direction.

9. In combination, two members relatively rotatable about a common axis, one of said members having locating abutment means thereon providing spaced gauge points, the other of said members having a plurality of locating abutment means annularly arranged about said axis and each providing a pair of spaced gauge points lying in a plane and at opposite sides of a normal from said plane through said axis, a unitary indexer member having locating abutment means on one side thereof engageable with said abutment means on the first mentioned of said relatively rotatable members and a second locating abutment means on the opposite side thereof selectively engageable with one of said pairs of spaced gauge points provided by said locating abutment means on the second mentioned of said relatively rotatable members, and means for moving said indexer member to move said second abutment means thereon into and out of engagement with said pair of spaced gauge points of a selected one of said abutment means on the second of said relatively rotatable members, one of said abutment means being inclined with respect to the direction of movement of said indexer member and said abutment means on opposite sides of said indexer member having parts spaced from each other in the direction normal to the direction of movement of said indexer member a distance greater than the minimum distance between said locating abutment means on the first of said relatively rotatable members and said spaced gauge points of a selected one of said abutment means on the second of said relatively rotatable members to provide wedge means between said abutment means on said two relative rotatable members tending to urge the two gauge points of the abutment means of said second mentioned relatively rotatable member engaged by said indexer member in opposite directions to prevent rotation of said relatively rotatable members in opposite directions.

10. In combination, two members relatively rotatable about a common axis, one of said members having a pair of spaced locating abutments thereon, the other of said members having a plurality of index notches or slots arranged in a circle about said axis the sides of which notches form spaced locating abutments, a unitary indexer member having locating abutments on one side thereof engageable with said abutments on the first mentioned of said relatively rotatable members and locating abutments on the opposite side thereof selectively engageable with a pair of said spaced locating abutments on the second mentioned of said relatively rotatable members, and means for moving said indexer member to move a plurality of said second mentioned abutments thereon into and out of engagement with a selected pair of said abutments on the second mentioned of said relatively rotatable members, a plurality of said abutments being inclined with respect to the direction of movement of said indexer member and said locating abutment means on opposite sides of said indexer member having parts spaced from each other in the direction normal to the direction of movement of said indexer member a distance greater than the minimum distance between said pair of abutments on the first of said relatively rotatable members and a selected pair of said abutments on the second of said relatively rotatable members whereby said indexer member is wedged between said pairs of abutments on said two relatively rotatable members when moved into engagement therewith and prevents rotation of said relatively rotatable members in opposite directions.

11. In combination, two members relatively rotatable about a common axis, one of said members having a pair of spaced locating abutments thereon, the other of said members having a plurality of index notches or slots arranged in a circle about said axis the sides of which notches form locating abutments, a unitary indexer member having locating abutments on one side thereof engageable with said abutments on the first mentioned of said relatively rotatable members and locating abutments on the other side thereof selectively engageable with a pair of generally diametrically spaced locating abutments on the second of said relatively rotatable members, and means for moving said indexer member transversely of the axis of rotation of said members to move said second mentioned locating abutments thereon into and out of engagement with a selected pair of said locating abutments on the second of said relatively rotatable members, a plurality of said locating abutments being inclined with respect to the direction of movement of said indexer member and said locating abutment means on opposite sides of said indexer member having parts spaced from each other in the direction normal to the direction of movement of said indexer member a distance greater than the minimum distance between said locating abutments on the first of said relatively rotatable members and a selected pair of said locating abutments on the second of said relatively rotatable members whereby said indexer member is wedged between said locating abutments on said two relatively rotatable members when in engagement therewith and prevents rotation of said relatively rotatable members in opposite directions.

12. In combination, two members relatively rotatable about a common axis, one of said members having a pair of spaced locating abutments thereon, the other of said members having a plurality of index notches or slots arranged in a circle about said axis the sides of which notches form locating abutments, a unitary indexer member having locating abutments on one side thereof engageable with said abutments on the first mentioned of said relatively rotatable members and locating abutments on the opposite side thereof selectively engageable with a pair of generally diametrically spaced locating abutments on the second of said relatively rotatable members, and means for moving said indexer member longitudinally of the axis of rotation of said members to move said second mentioned locating abutments thereon into and out of engagement with a selected pair of said locating abutments on the second of said relatively rotatable members, a plurality of said abutments being inclined with respect to the direction of movement of said indexer member and said locating abutments on opposite sides of said indexer member having parts spaced from each other in the direction normal to the direction of movement of said indexer member a distance greater than the minimum distance between said locating abutments on the first of said relatively rotatable members and a selected pair of said abutments on the second of said relatively rotatable members whereby said indexer member is wedged between said locating abutments on said two relatively rotatable members when in engagement therewith and prevents rotation of said relatively rotatable members in opposite directions.

13. In combination, two members relatively rotatable about a common axis, one of said members having a pair of spaced locating abutments thereon, the other of said members having a plurality of index notches or slots arranged in a circle about said axis the sides of which notches form locating abutments, a unitary indexer member having locating abutments on one side thereof engageable with said abutments on the first mentioned of said relatively rotatable members and locating abutments on the opposite side thereof selectively engageable with a pair of generally diametrically spaced locating abutments on the second mentioned of said relatively rotatable members, and yieldable means for moving said indexer member to move said second mentioned locating abutments thereon into engagement with a selected pair of said locating abutments on the second mentioned of said relatively rotatable members, a plurality of said abutments being inclined with respect to the direction of movement of said indexer member and said locating abutment means on opposite sides of said indexer member having parts spaced from each other in the direction normal to the direction of movement of said indexer member a distance greater than the minimum distance between said locating abutments on the first of said relatively rotatable members and a selected pair of said locating abutments on the second of said relatively rotatable members whereby said indexer member is wedged between said abutments on said two relatively rotatable members when moved into engagement therewith and prevents rotation of said relatively rotatable members in opposite directions.

14. In a drafting or like device, a member having a plurality of index notches or slots arranged in a circle the sides of which notches form locating abutments, a ruler or instrument assembly supported by said member for rotation about an axis generally concentric with said notches and having a plurality of locating abutments thereon, a unitary indexer member carried by said ruler or instrument assembly and having locating abutments on one side thereof engageable with said abutments on said ruler or instrument assembly and locating abutments on the opposite side thereof selectively engageable with a selected pair of said locating abutments on said member formed by generally diametrically opposite notches, and yieldable means for moving said indexer member in a direction to move said second mentioned abutments thereon into engagement with a selected pair of said abutments on said member, and manually operable means for withdrawing said indexer member from said notches, a plurality of said locating abutments being inclined with respect to the direction of movement of said indexer member and said locating abutments on opposite sides of said indexer member having parts spaced from each other in the direction normal to the direction of movement of said indexer member a distance greater than the minimum distance between said locating abutments on said ruler or instrument assembly and a selected pair of said locating abutments on said first mentioned member to wedge said indexer member between said locating abutments on said first mentioned member and said ruler or instrument assembly when said indexer member is moved into engagement therewith and prevent rotation of said ruler or instrument assembly relative to said first mentioned member in opposite directions.

15. In a drafting or like device, a member having a plurality of pairs of generally diametrically disposed index notches or slots arranged in a circle with each pair of said diametrically disposed notches having adjacent sides lying in a common plane and forming a pair of locating abutments, a ruler or instrument assembly supported by said member for rotation about an axis generally concentric with said notches and having a plurality of locating abutments thereon, a unitary indexer member carried by said ruler or instrument assembly and having a pair of locating abutments on one side thereof engageable with said abutments on said ruler or instrument assembly and another pair of locating abutments on the opposite side thereof selectively engageable with a selected pair of said locating abutments on said first mentioned member, and yieldable means for moving said indexer member in a direction to move said second mentioned pair of abutments thereon into engagement with a selected pair of said abutments on said first mentioned member, and manually operable means for withdrawing said indexer member from said notches, said manually operable means including a thumb piece movably supported in said ruler or instrument assembly, a plurality of said abutments being inclined with respect to the direction of movement of said indexer member and said pairs of locating abutments on opposite sides of said indexer member having parts spaced from each other in the direction normal to the direction of movement of said indexer member a distance greater than the minimum distance between said locating abutments on said ruler or instrument assembly and a selected pair of said locating abutments on said first mentioned member to wedge said indexer member between said abutments when said indexer member is moved into engagement therewith and prevent rotation of said ruler or instrument assembly relative to said member in opposite directions.

CHARLES HUBBARD LITTLE.

References Cited in the file of this patent

UNITED STATES PATENTS

| Number | Name | Date |
|---|---|---|
| 409,759 | Schmidlapp | Aug. 27, 1889 |
| 456,715 | Berry | July 28, 1891 |
| 679,413 | Bunker | July 30, 1901 |
| 765,300 | Williams | July 19, 1904 |
| 859,917 | Claus | July 16, 1907 |
| 901,590 | Butlin | Oct. 20, 1908 |
| 970,793 | Carlson | Sept. 20, 1910 |
| 1,208,340 | Little | Dec. 12, 1916 |
| 1,761,712 | Emmert | June 3, 1930 |
| 1,946,062 | Cramp | Feb. 6, 1934 |
| 2,137,004 | Langsner | Nov. 15, 1938 |
| 2,228,140 | Little | Jan. 7, 1941 |
| 2,236,656 | Wallace | Apr. 1, 1941 |
| 2,238,581 | De Lisle | Apr. 15, 1941 |
| 2,302,942 | Golber | Nov. 24, 1942 |
| 2,332,860 | Langsner | Oct. 26, 1943 |
| 2,394,344 | Wallace | Feb. 5, 1946 |
| 2,400,733 | Baker | May 21, 1946 |

FOREIGN PATENTS

| Number | Country | Date |
|---|---|---|
| 418,328 | Great Britain | Oct. 23, 1934 |
| 503,102 | Great Britain | Mar. 31, 1939 |
| 517,883 | Great Britain | Feb. 12, 1940 |